United States Patent [19]

Feichtiger et al.

[11] Patent Number: 5,181,749

[45] Date of Patent: Jan. 26, 1993

[54] APPARATUS FOR SUPPORTING THE SIMULTANEOUS ESTABLISHMENT OF A PLURALITY OF PARALLEL, FLUID PLUG CONNECTIONS

[75] Inventors: Dieter Feichtiger, Aidlingen; Bernd Eichberger, Ottenbronn, both of Fed. Rep. of Germany

[73] Assignee: Mercedes-Benz AG, Fed. Rep. of Germany

[21] Appl. No.: 691,404

[22] Filed: Apr. 25, 1991

[30] Foreign Application Priority Data

May 8, 1990 [DE] Fed. Rep. of Germany ....... 4014666

[51] Int. Cl.⁵ .............................................. F16L 35/00
[52] U.S. Cl. ........................................ 285/26; 285/93; 285/137.1; 285/921; 285/317
[58] Field of Search ................. 285/26, 29, 137.1, 317, 285/921, 93

[56] References Cited

U.S. PATENT DOCUMENTS

| 4,089,549 | 5/1978 | Vyse et al. ........................ 285/137.1 |
| 4,116,476 | 9/1978 | Porta et al. ........................ 285/137.1 |
| 4,332,432 | 6/1982 | Colleran . |
| 4,915,419 | 4/1990 | Smith ............................ 285/137.1 X |

FOREIGN PATENT DOCUMENTS

| 0003311 | 8/1979 | European Pat. Off. . |
| 2746921 | 4/1978 | Fed. Rep. of Germany . |
| 2947855 | 9/1981 | Fed. Rep. of Germany . |
| 3810385 | 3/1989 | Fed. Rep. of Germany ........ 285/26 |

*Primary Examiner*—Dave W. Arola
*Attorney, Agent, or Firm*—Evenson, Wands, Edwards, Lenahan & McKeown

[57] ABSTRACT

An apparatus for supporting the simultaneous establishment a plurality of parallel, fluid plug connections, contains a holding plate having apertures arranged in at least one straight row to receive junction pieces of fluid lines which are provided with abutments, and a securing slide which can be guided displaceably along one slide direction in the holding plate and has at least one contour which, by displacing the securing slide, can be brought into a position fastening the junction pieces in the apertures. The openings in the holding plate are of non-round constuction such that, after their axial insertion and transverse displacement, the abutments of the junction pieces can be fixed axially with positive fit, at least provisionally, on one edge of the respective aperture. The at least one contour fastening the junction pieces is of straight construction parallel to the slide direction of the securing slide so that the junction pieces can be fastened laterally within the non-round apertures in the position, in which their abutments are in engagement with the edge, by means of the at least one contour of the securing slide. The contour is straight and extends with respect to the edge on the side of the junction pieces facing away from the edge. The securing slide can be displaced relative to the holding plate while maintaining the fastening of the junction pieces. This can be used in an advantageous manner for the arrangement of connection elements for the joint attachment of the holding plate and securing slide on a component, which is to be contacted fluidically with all the junction pieces at the same time, solely in the securing slide.

34 Claims, 4 Drawing Sheets

APPARATUS FOR SUPPORTING THE SIMULTANEOUS ESTABLISHMENT OF A PLURALITY OF PARALLEL, FLUID PLUG CONNECTIONS

BACKGROUND AND SUMMARY

The present invention relates to an apparatus for supporting a simultaneous establishment of a plurality of parallel, fluid plug connections, containing a holding plate having apertures arranged in at least one straight row to receive junction pieces of fluid lines which are provided with abutments and can be inserted axially, and a securing slide which can be guided displaceably along one slide direction in the holding plate and has at least one contour which, by displacing the securing slide, can be brought into a position fastening the junction pieces in the apertures.

A support apparatus is shown in DE 27 46 921 C3. The essence of this apparatus is a holding plate having circular apertures and a likewise plate-shaped securing slide which is connected to the holding plate such that one is guided displaceably on the other by a short path in a linear manner. It has recesses, the outline of which is formed by two circular cutouts with different diameters overlapping each other. The inside diameter of the recesses is no smaller at any point than the diameter of the smaller circular cutout. The recesses thus have approximately the outline of lock cylinders used in doors to houses and apartments, and their greatest inside diameter lies parallel to the displacement direction of the securing slide.

The larger circular cutouts of its recesses are aligned with the apertures of the holding plate. In its opposite end position, the smaller circular cutouts of the recesses are aligned with the same apertures. The latter are provided for receiving a multiplicity of junction pieces of pneumatic or hydraulic lines which are provided with circumferential abutments in the form of annular grooves and can be pushed into the apertures up to a stop when the securing slide is in the said first end position. In this case, the junction pieces have a slight radial clearance in the apertures. If the securing slide is now brought into the second end position, the edges of the smaller circular cutouts of its recesses engage with the grooves of the junction pieces so that the junction pieces are held positively by the securing slide in the holding plate.

With this apparatus, a fluid multiple adaptor with individual junction pieces, which can be exchanged in a simple manner, can be manufactured. The multiple adaptor can be connected in total to a distributor or the like with a number of connectors corresponding to the number of the plugged lines or junction pieces. The holding plate is screwed onto the distributor together with the securing slide. The securing slide is likewise guided in the holding plate in a longitudinally extending indentation and is held therein by screws sliding in elongated holes.

In the known apparatus, the correct plugged-in state of all the junction pieces has to be expressly ensured before the securing slide is pushed into its second security end position because no catch facility or the like for the holding plate is provided in the holding plate itself. Additionally, both the holding plate and the securing slide must be provided with apertures or recesses precisely matching the junction pieces. This causes a relatively great outlay in terms of production. The screw connections between the securing slide and the holding plate, on one hand, and the holding plate and the distributor, on the other hand, also require a relatively long time to fit together.

Finally, in an embodiment of the known apparatus, screw or plug-in bolts, which are to be handled separately, are provided for securing the securing slide in its second end position while the securing elements of a second embodiment which snap in automatically in a securing manner each have to be pressed back individually counter to spring force into a release position using a suitable tool when they are released, for the exchange or removal of junction pieces and, moreover, likewise cause a great production outlay.

In the known fluid multiple adapter shown in DE 29 47 855 A1, two holding discs are arranged in parallel and having passage holes and are used for fastening the plug-in nipples. The plug-in nipples are plugged into the approximately aligned passage holes of the two holding discs and fastened positively therein by mutual rotation of the holding discs. Edges of the passage holes in the holding discs are thereby immersed in abutments of the plug-in nipples in the shape of circumferential grooves so that a crescent-shaped overlap between the immersed edges and the outer contour of the plug-in nipple results in the axial projection. In the fastening position, the holding discs are mutually interlocked.

In known electrical multiple plug connectors shown in U.S. Pat. No. 4,332,432, a slide is guided in or on one of the housing parts for connecting the plug-in pins arranged fixedly in a first connector housing part to corresponding plug sockets which are arranged fixedly in a second connector housing part. The slide is manually displaceable and, in the correct relative position between the two housing parts, effects the simple and simultaneous establishment of the electrical contact by the two preplugged or abutted housing parts being moved towards each other via sloping side guides of the slide which is moved manually transversely to the plugging-in direction. Upon reversal of the direction of the movement of the slide, the latter once more separates the plugged multiple plug connection.

British Patent No. 1,442,837 likewise describes an electrical multiple plug connector which is provided with a movable slide. This slide does not, in fact, support the approach of two connector housing parts, but serves for their automatic locking after the electrical contact has already been produced manually. It is resiliently prestressed into its locking position, is moved counter to the spring force by a short stroke during the joining of the plug connection and drops into its locking position on completion of the joining. If it is moved manually counter to the spring force in the plugged connection, the connector housing parts and once more separated from each other by sloping slide guides of the slide.

In these types of electrical multiple plug connectors, the exchange of individual leads/plug pins/plug sockets is, in general, not readily possible. Accordingly, the slides provided in such connectors are in no way designed for fastening electrical connector contacts in the connector housing parts.

An object of the invention is to provide an apparatus such that its production and at least the insertion and fastening of the individual junction pieces in the holding plate are greatly simplified.

The foregoing object has been achieved according to the present invention by way of a positive-fit axial fixing of the junction pieces in the holding plate by an edge of the apertures of non-round construction of the holding plate. The edge extends at least over a limited circumferential section of each aperture and is configured so as to engage with the abutments of the junction pieces. The edge is provided in each case on one side and at the end of the greatest inside diameter of the non-round apertures. Lateral fastening of the junction pieces transversely to their insertion direction within the non-round apertures in the position in which their abutments (5 W) are in engagement with the edge by at least one contour of a securing slide. The contour is straight and extends in relation to the edge on the side of the junction pieces facing away from the edge.

As a result of such an apparatus, the junction pieces, can be pushed against an edge of the respective aperture, after their axial insertion in the insertion part within the respective non-round aperture. The edge thereby comes into engagement with the abutment of the respective junction piece, and by way of which they are then already secured provisionally against dropping out. With this significant improvement in the insertion of the junction pieces, the simultaneous establishment of parallel fluid plug connections of the junction pieces is far better supported than with known apparatus. A simpler production of the apparatus is also already guaranteed by the simplified form of the securing slide.

The edge will, of course, have to be matched to the contour of the abutment, but it can be of circular, oval or multi-cornered shape, e.g. polygonal or prismatic, which results in a corresponding shape of the non-round aperture, at least in the region of this edge.

It is possible in conjunction with the described fixing of the junction pieces in the apertures simply to configure the contour of the securing slide fixing the junction pieces within the aperture to have a straight line, the contour being guided along the row of junction pieces when the securing slide is pushed in in such a way that it reliably prevents lateral sliding-off of the abutments from the axially fixing edge of the aperture in each case.

In a presently preferred embodiment of the invention, the edge is of round construction so that standardized shapes of essentially cylindrical junction pieces can be used and their likewise cylindrical abutments, in particular annular grooves or elevations, can come into engagement with the edge over the largest possible circumference in the sense of the best possible axial support. For this purpose, in accordance with an advantageous development of the apparatus according to the invention, the non-round apertures of the holding plate have an insertion part provided for axial insertion of the junction pieces and the abutments of greater inside diameter and have a holding part which is provided with the edge of smaller inside diameter, is round and partially overlaps the insertion part. The junction pieces in the holding part of the respective non-round aperture are axial fastened after their axial insertion in the insertion part. For this purpose, the junction pieces are pushed transversely to their insertion direction and in the direction of the greatest inside diameter of the respective non-round aperture and the abutments are brought into engagement with the edge of the holding part.

The greatest inside diameter of all the non-round apertures are angularly oriented relative to the slide direction and the at least one straight contour of the securing slide. The insertion parts of the apertures are at least partially covered by the pushed-in securing slide, by which the junction pieces are fastened in the respective holding part by the at least one straight contour of the securing slide. The support of the simultaneous establishment of parallel fluid plug connections of the junction pieces is further thereby improved.

In a basic embodiment of the apparatus according to the present invention having a single row of apertures in the holding plate, the securing slide can be of a very simple, for example a ruler-type design, with one of its longitudinal edges fastening the junction pieces when it is pushed in.

It is, of course, understood that in this and other shapes of the securing slide provided within the framework of the invention, the defined fastening of said securing slide in relation to the holding plate can be dispensed with because it is not essential, for the effective lateral fastening of the junction pieces, which part of the straight contour of the securing slide actually prevents a junction piece from being pushed back into the insertion part of the respective aperture.

Advantageously, a narrowing in the transition between the insertion part and the holding part can be provided in each aperture of the holding plate. The narrowing allows the junction pieces to snap into the holding part even before the securing slide is pushed in. Then firstly only an additional securing function remains for the securing slide, in which securing function it only reliably prevents the junction pieces from moving back into the insertion part under the effect of forces without its said straight contour having to be brought into contact continuously with the junction pieces or even having to grip behind the abutments provided.

In conjunction with the above-mentioned sliding mobility of the securing slide even when the junction pieces are fastened, there is a resulting possibility of using the securing slide additionally for attaching or locking the holding plate and the junction pieces on a component which is to be contacted fluidically with the junction pieces and thus to allocate a dual function for the securing slide.

BRIEF DESCRIPTION OF THE DRAWINGS

These and other objects, features and advantages of the present invention will become more apparent from the following detailed description of presently preferred embodiments when taken in conjunction with the accompanying drawings, wherein.

DETAILED DESCRIPTION OF THE DRAWINGS

Figure 1:
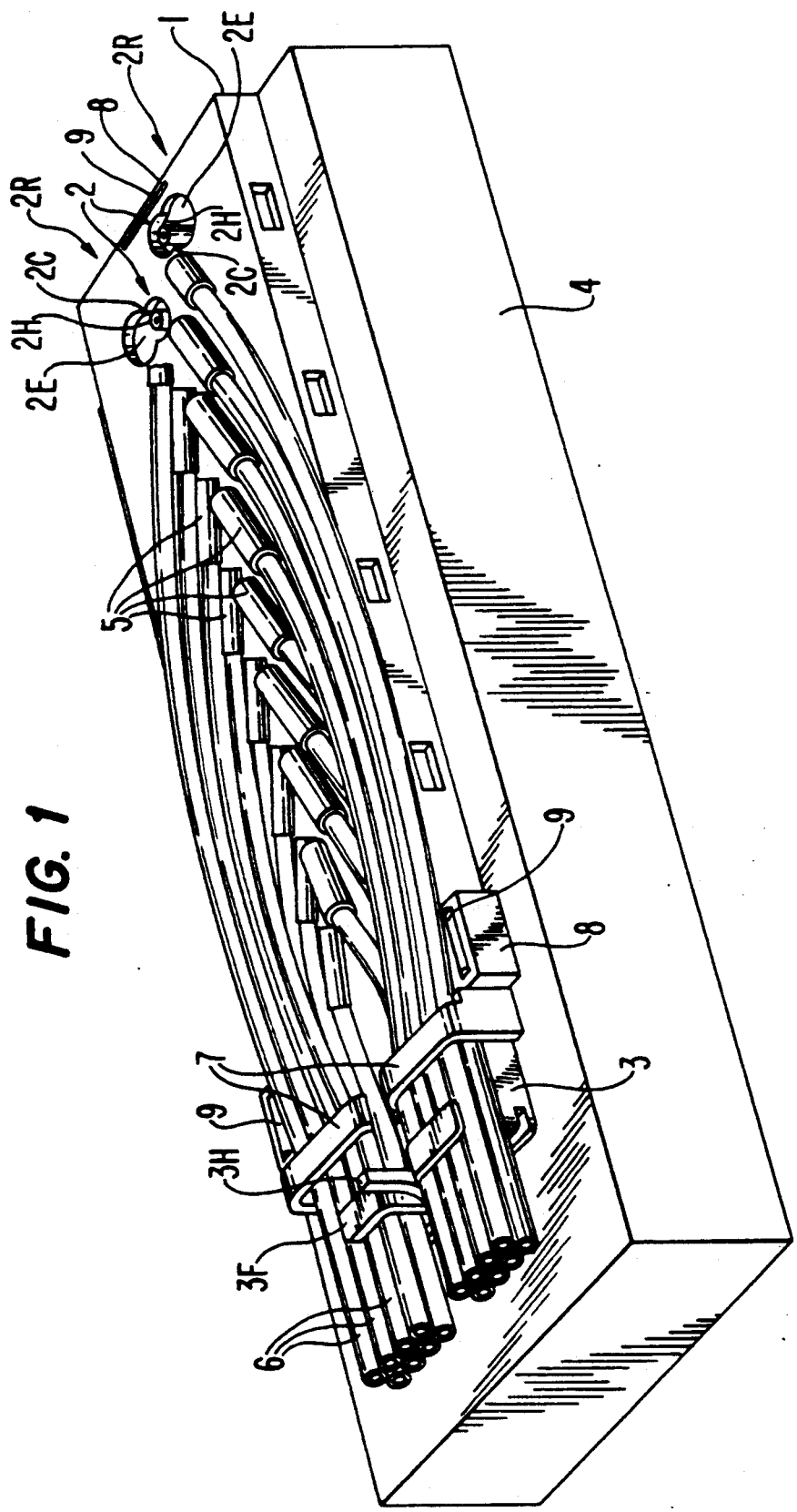
FIG. 1 is a perspective view of an apparatus according to the present invention having junction pieces plugged into two rows of apertures and a component, e.g. a housing of a magnetic valve module, the fluid connectors of which are contacted fluidically with the junction pieces.
Figure 4:
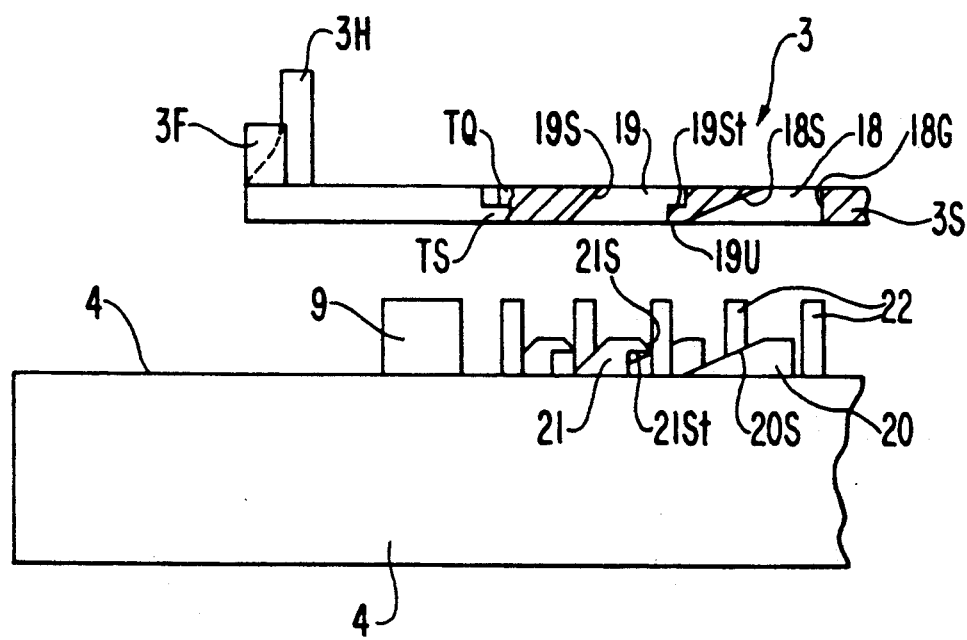
FIG. 4 is a cross-sectional view through guide and connection elements provided on the securing slide in relation to corresponding guide and connection apparatus of the component from FIG. 1 in an opened-out illustration.
Figure 5:
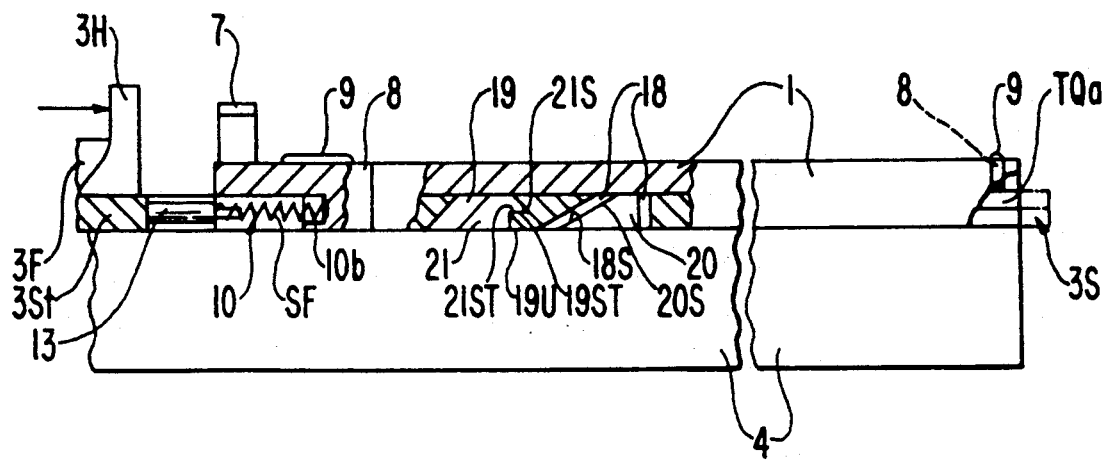
FIG. 5 is a partial sectional lateral view of the holding plate, the securing slide and the component without junction pieces, with the sectional view from FIG. 4 with connection elements of the securing slide in locked engagement and connectors of the component having been repeated in an extract.

In FIG. 1, a holding plate 1 having apertures 2 together with a securing slide 3 is attached on a component 4, e.g. a housing of a magnetic valve module, in a manner to be described later (FIGS. 4 and 5). The apertures 2 are provided to receive in each case one of a multiplicity of junction pieces 5 which, in turn, are fixedly connected to a line 6 in each case. Two apertures 2 are shown empty in a broken away portion of the junction pieces 5 in order to show their non-round shape which is formed by an insertion part 2E with a greater inside diameter provided for axial insertion of the junction pieces 5 and a holding part 2H with a smaller inside diameter. A narrowing 2C is provided in the transition region between each insertion part 2E and the holding part 2H, and the inside diameter of each narrowing 2C, measured transversely to the longitudinal extension or the greatest inside diameter of the aperture 2, is slightly smaller than the inside diameter of the respective holding part 2H. Being pushed over the narrowing 2C, the junction pieces 5 can be clipped into the holding part 2H transversely to their insertion direction. In this case, all the apertures 2 have the same dimensions, but it is, of course, possible to provide apertures in a holding plate for junction pieces of different outside diameter and to fasten said junction pieces with a single securing slide.

Wings 7 are molded onto the holding plate 1 and hold the lines 6 in bundles. Similar wings 3F are also molded onto the securing slide 3 next to a handle 3H. Additionally, portions 8 are molded onto the holding plate 1, in which portions coding projections 9 can be inserted. The coding projections 9 are molded onto the component 4 or onto its upper side 4o. These positional coding devices 8 and 9 provide an unambiguous positive specification of the assembly position of the holding plate 1 on the component 4; when the holding plate 1 is placed on the component 4, these devices guide the holding plate 1 perpendicular to the upper side 4o of the component 4.

Figure 2:
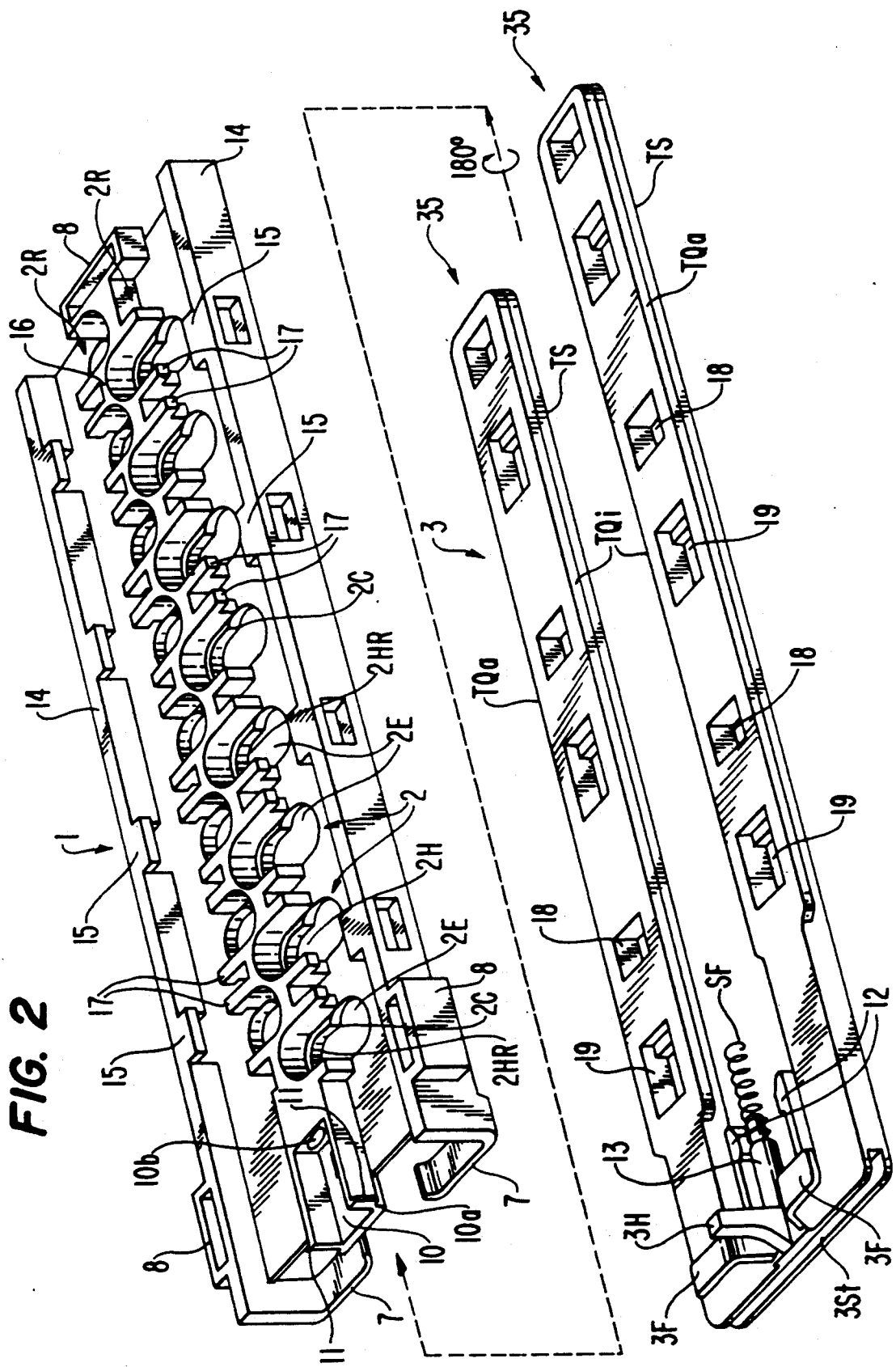
FIG. 2 is an exploded perspective view of the holding plate without junction pieces and of the associated U-shaped securing slide, in which the holding plate is rotated by 180° about its longitudinal axis in comparison with FIG. 1.

FIG. 2 shows the upper side of the securing slide 3 and the underside of the holding plate 1 which has been rotated by 180° about its longitudinal axis in comparison to its normal position illustrated in FIG. 1. The apertures 2 of the holding plate 1 can be seen to be arranged at regular intervals in two rows 2R extending parallel to each other. Within these rows 2R, all the apertures 2 are oriented identically, i.e. all the plug-in parts 2E or holding parts 2H each point in the same direction. The greatest inside diameter of all the apertures 2 lies at right angles to the longitudinal axis of the holding plate 1 and to the slide direction of the securing slide 3 indicated by dashed arrows. The holding parts 2H each have an edge 2HR which determines the inside diameter of the holding parts 2H, and the purpose of which will be described below with reference to FIG. 3.

The two rows 2R are oriented in opposite directions relative to each other, i.e. the plug-in parts 2E of all the apertures 2 lie further towards the respective outside edge of the holding plate 1 whereas the holding parts 2H of all the apertures 2 point towards the longitudinal mid-axis of the holding plate 1. Accordingly, the slide direction of the junction pieces 5 converges in opposite directions in the two rows when the junction pieces are pushed into a holding part 2H. Additionally, the apertures 2 of the two rows 2R are arranged mutually offset in the longitudinal course of the rows. This has the advantage that the longitudinal axes of the two rows 2R can be brought nearer to each other than if the apertures 2 were to lie mutually opposite in each case.

The elongated, rectangular holding plate 1 has on one transverse side, namely the plug-in side of the securing slide 3, a trough-type recess 10 which is open on one side 10o down to the bottom. A catch projection 11 is molded onto both sides of the side 10o in each case on the outside. The side of the recess opposite the open side 10o is provided with a borehole 10b. Two members 8 are molded onto longitudinal edges 14 of the holding plate 1, and the longitudinal edges 14 are molded on at an angle to the flat surface of the holding plate 1.

The securing slide 3 is essentially U-shaped having two limbs 3S which extend longitudinally parallel, are of different length and are interconnected by a transverse web 3St. Wings 3F of the securing slide 3 are molded onto the transverse web 3St on both sides of a handle 3H which can be used for introducing manual sliding forces into the securing slide 3. Likewise, two catch hooks 12 are molded onto the transverse web 3St and extend between the limbs 3S to form a catch device, together with the catch projections 11 of the holding plate 1, for securing the securing slide 3 in the holding plate. The hooks 12 are caught by the catch projections 11 in the guides of the holding plate 1 when the securing slide 3 is pushed in.

A pin 13 is also molded onto the transverse web 3St between the parallel catch hooks of the securing slide 3 and bears a helical compression spring SF. When the securing slide 3 is pushed into the guides of the holding plate 1, the helical compression spring SF is inserted from the open side 10o into the recess 10 and is centered in the recess by the borehole 10b opposite the open side 10o of the recess 10. The spring SF is thereby stressed and presses the securing slide 3 in a direction counter to its pushing-in direction. The catch device prevents the further sliding-out of the securing slide 3 from the holding plate 1. In this manner, a limited relative sliding mobility of the securing slide 3 which is pushed into the holding plate 1 is achieved in relation to the holding plate 1. This mobility has no negative influence on the fastening of the junction pieces 5 in the apertures 2 but, like the recesses 18 and 19 in the limbs 3S distributed over the longitudinal extension, is significant for the attachment of the securing slide 3 and the holding plate 1 on the component 4, as will be described in detail below with reference to FIG. 5.

The limbs 3S of the securing slide 3 have an approximately T-shaped cross-section, with the vertical portion TS taking up virtually the entire width of the limbs 3S whereas the horizontal T-bar is formed by narrow guide strips TQa or TQi molded onto the stick. The inside, mutually facing strips TQi define a gap and, in turn, form the straight contours of the securing slide 3 for fastening the junction pieces 5 in the holding parts 2H of the apertures 2.

In order to push the securing slide 3 from the position shown into the holding plate 1 or into its guides, along the dashed arrows pointing in the slide direction, the securing slide 3 or the holding plate 1 must firstly be rotated by 180° about its longitudinal axis, which is indicated on the right of the securing slide 3 by a rotation arrow specifying the angle "180°." The guides of the holding plate 1 for the securing slide 3 (or, more precisely, for the two limbs 3S which likewise form a T-cross-section in the longitudinal projection in a T-groove manner standing on its transverse part) are each formed on the outside by the longitudinal edges 14 of the holding plate 1. Inwardly projecting protrusions 15 are molded onto the longitudinal edges 14 and are angled off from the latter.

Figure 3:
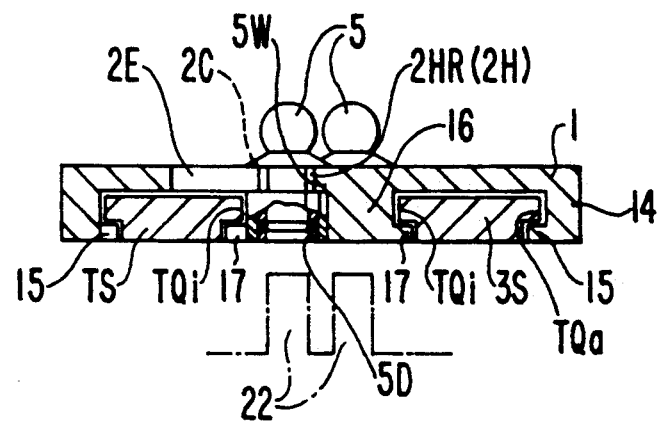
FIG. 3 is a sectional view of one of the apertures of the holding plate to receive a line junction piece with a plugged-in line junction piece.

The guides of the holding plate 1 for the securing slide 3 are formed on the inside by a central web 16 which is molded integrally onto the holding plate 1. The web 16 contains, at one end, the previously mentioned recess 10 and its end-side borehole 10b and, at its other end, a third member 8. The web 16 also forms an additional guide for the junction pieces 5 which are pushed into the holding parts 2H of the apertures as shown in FIG. 3. Protrusions 17 are molded onto the central web 16 between each two apertures 2 and point towards the protrusions 15 of the longitudinal edges 14. The protrusions 15, 17 are distributed in pairs evenly in two parallel guides over the longitudinal course of the holding plate 1, but are arranged mutually offset in the two guides with respect to the longitudinal axis of the holding plate 1. Accordingly, the limbs 3S of the securing slide 3 are of different length so that they come into contact simultaneously with the pairs of protrusions 15, 17 provided for them.

It can be seen more clearly from the sectional view shown in FIG. 3 how a plugged-in junction piece 5 is anchored in the holding part 2H of an aperture 2 of the holding plate 1 and is fixed therein by a straight contour of the pushed-in securing slide 3. The edge 2HR of the holding part 2H engages in an annular groove, forming an abutment 5W, of the junction piece 5 which is pushed in, passing over the narrowing 2C, illustrated only in dashed lines because it is invisible here. The junction piece 5 is provided with an inserted sealing ring 5D which can be pushed in a sealing manner onto a cylindrical connector nozzle 22, of the component 4, which is only schematically indicated in FIG. 3, but is shown in more detail in FIG. 4.

With the above-described embodiment of the holding plate 1 and securing slide 3 even a single row of plug connections or junction pieces can be fastened in corresponding apertures 2 by a ruler-type securing slide. To this effect, the arrangement can just be imagined, for example, without the right half of the holding plate 1 and the right limb 3S of the securing slide 3 along the lines shown in FIG. 6. The positive-fit guiding of the T-shaped limbs 3S of the securing slide 3 by the protrusions 15 of the longitudinal edges 14 and the protrusions 17 of the central web 16 of the holding plate 1 is also shown clearly here. Moreover, the small constructional height of the arrangement of securing slide 3 and holding plate 1 becomes evident.

The purpose of the recesses 18, 19 in the limbs 3S, already shown in FIG. 2, is explained below with reference to the description of FIGS. 4 and 5 from which it can be seen how the securing slide 3, and thus the holding plate 1 connected thereto by the sliding guides 14, 15, 16, 17 illustrated in FIG. 3, is attached on the component 4.

A portion of a limb 3S of the securing slide 3 is drawn in FIG. 4 in cross-section above a side view of the component 4 and raised from the latter. The holding plate 1 has been omitted in FIG. 4. The previously mentioned recesses 18, 19 are distributed in pairs over the longitudinal extension of the limbs 3S and have different dimensions and inner contours. For simplification of this illustration, in FIGS. 4 and 5 only one pair of recesses 18, 19 is shown in cross-section. The other recesses are, of course, of identical shape in each case. Each pair of recesses consists of a trapezoidal insertion or ejection recess 18, generally denoted as a guide element, with a greater free cross-section, which has a straight end side 18G extending transversely to the longitudinal extension of the limb 3S and a slightly inclined end side or inner contour 18S opposite the straight end side 18G extending likewise transversely to the longitudinal extension. A likewise essentially trapezoidal locking recess 19, generally denoted as a connection element, with a smaller free cross-section, has a stepped end side or inner contour 19St extending transversely to the longitudinal extension of the limb 3S having a lower edge 19U and a steeply inclined end side 19S opposite the end side 19St extending likewise transversely to the longitudinal extension.

The component 4 is provided on its essentially flat upper side 4o with shoulders 20, 21 corresponding in shape in pairs to the recesses 18 or 19 of the securing slide 3. The trapezoidal shoulders 20, generally to be denoted as guide means, are straight on one side and sloped on the other side (end side 20S) at the same angle as the end side 18S of the recesses 18. The hook shaped shoulders 21, generally denoted as connectors, are stepped on one side, with one step 21St, and being sloped on the other side at about the same angle as the end side 19S of the recesses 19.

A guide slope 21S, generally denoted as centering device, is also molded onto each of the hook-shaped shoulders 21 above the step 21St. Finally, a relatively large number of connector nozzles 22 also projects from the upper side 4o of the component 4, by way of which the junction pieces 5 can be simultaneously fluidically contacted.

The distribution of the apertures 2 or their holding parts 2H in the holding plate 1 corresponds exactly to the distribution of the connector nozzles 22 on the upper side 4o of the component 4. The mid-axes of the holding parts 2H of the apertures 2 of the holding plate 1, and thus the mid-axes of the junction pieces 5 fastened therein, are exactly aligned on the connector nozzles 22 of the component 4 by the above-mentioned coding projections 9 and members 8.

FIG. 5 shows a partially sectional lateral view of the arrangement connected to the component 4 consisting of the holding plate 1 and securing slide 3, in which view the installation position of the compression spring SF is also visible. For simplification of the parts shown in FIG. 5, the line junction pieces 5 have been omitted. As indicated by dashed lines, the free end of the longer limb 3S of the securing slide 3 can emerge on the right side of the holding plate 1. The securing slide 3 can be pushed manually into its end or locked position, as shown, by this free end.

To obtain the locking function, the dimensions, contours and relative positions of the recesses 18, 19 and of the shoulders 20, 21 are selected such that the securing slide 3, together with the holding plate 1 and the fastened junction pieces 5, can be placed on the component 4. The coding projections 9 are inserted in the members 8 of the holding plate 1 and fix the latter on the component 4 so as to be laterally non-displaceable. At a pressure load directed approximately perpendicular to the upper side 4o of the component 4, the securing slide 3 is displaceable in the holding plate 1 along its sliding guides, is guided by the sloping end sides of its recesses 18 and of the trapezoidal shoulders 20 of the component 4, with the end sides all coming into contact in pairs simultaneously.

The entire arrangement consisting of holding plate 1, securing slide 3 and junction pieces 5 (FIG. 3) is lowered onto the component 4 in the direction guided by the coding projections 9 and the members 8 of the holding plate 1. The guide slopes 21S of the hook-shaped shoulders 21 of the component 4 center the recesses 18, 19 with respect to the shoulders 20, 21 respectively in interaction with the lower edges 19U of the recesses 19 of the securing slide 3. Consequently, the sloping end sides 18S, 20S are inevitably pressed onto each other when the holding plate 1 is placed on correctly and can slide off each other under continued contact pressure. By way thereof, in the placing-on operation described, a relative sliding movement, which superimposes the placing-on movement and is perpendicular to the latter, is enforced between the securing slide 3 and the holding plate 1.

Preferably the fittings between the recesses 18, 19 and the shoulders 20, 21 respectively are configured and sized to be relatively tight so that the shoulders slide snugly in the recesses. The recesses 19 are dimensioned to have an inside diameter which is in any case sufficient for inserting the shoulders 21, as measured in the slide direction of the securing slide 3.

The step 21St of the trapezoidal shoulders 21 corresponds negatively in shape to the stepped end side 19St of the recess 19. Towards the end of the mentioned displacement of the securing slide 3 in the holding plate 1, which is supported by the force of the stresses compression spring SF, the stepped end sides 19St of the recesses 19 abut with the steps 21St of the hook-shaped shoulders 21 facing them. By way thereof, the entire arrangement 1, 3 and 5 is provisionally fixed on the upper side 4o of the component 4.

Provision can be made for the illustrated end position of the securing slide 3 with respect to the shoulders 20 and 21. Positive-fit engagement between the stepped end sides 19St of the recesses 19 and the steps 21St of the shoulders 21 facing them is achieved by starting from the above-mentioned abutting of the stepped contours but only by a manually introduced pulling on the handle 3H or pressure on the free end of the longer limb 3S of the securing slide 3. With this manipulation, the fitter can be certain, for example by a passable catch point, that the locking has been produced correctly. The compression spring can also, however, preferably be dimensioned to be so strong or long that it alone is capable of producing the shown locking engagement of the stepped end sides 19St of the recesses 19 of the securing slide 3 with the steps 21St of the hook-shaped shoulders 21 of the component 4.

Then the securing slide 3, which is stressed by the spring SF against the catch device 11 and 12, is displaced to the right by a slight path which corresponds to the projection of the guide slopes 21S onto the upper side 4o of the component 4. When the entire arrangement 1, 3 and 5 is placed on the component 4 in the direction perpendicular to the upper side 4o of the component, the coding projections 9 of the component enter the members 8 of the holding plate 1 and an adequate force of contact pressure is exerted firstly by the guide slopes 21S and the lower edges 19U counter to the force of the compression spring SF. The recesses 18, 19 of the securing slide 3 in each case are centered simultaneously and automatically on the shoulders 20, 21, respectively and subsequently are brought into positive-fit engagement. The actual locking is then effected after the holding plate 1 has been placed on completely. The underside of the holding plate 1 or of the securing slide 3 is then seated on the upper side of the component, and solely by the force of the spring SF the steps of the end sides 19St of the recesses 19 are pushed under the steps 21St of the hook-shaped shoulders 21.

For the unlocking function as can further be seen in FIG. 5, when the securing slide 3 is pushed into its illustrated locking end position on the component 4, a small gap is formed in each recess 18 between the sloping end side 18S and the corresponding sloping side of the shoulders 20. For unlocking or removing the arrangement 1, 3 and 5 from the component 4, the securing slide 3 can, in turn, be pushed by way of the handle 3H in the direction of the arrow toward the right and counter to the force of the compression spring SF relative to the holding plate 1 but parallel to the upper side 4o of the component 4. After a short displacement path, which is approximately equal to the projection of the above-mentioned gap onto the upper side 4o, the sloping end sides 18S of all the recesses 18 run simultaneously against the opposite slopes of the shoulders 20. In this position, the stepped end sides 19St of the recesses 19 and the steps 21St of the shoulders 21 are brought out of engagement, i.e. the positive-fit locking is lifted. If the displacement of the securing slide 3 is continued in the same direction, the arrangement 1, 3 and 5 is displaced in parallel, guided along the slopes, the recesses 18, 19 finally becoming detached from the shoulders 20, 21 and the junction pieces 5 being removed from the nozzles 22. The entire arrangement is released from the component 4 and can be removed.

Figure 6:
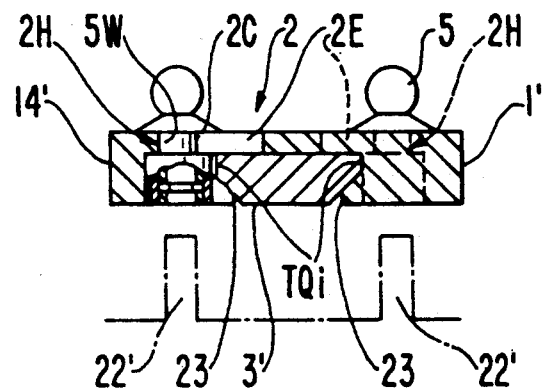
FIG. 6 is a sectional view of another embodiment of the present invention, in which a ruler-type securing slide has been used for fastening junction pieces plugged into two rows of apertures, in a manner analogous to FIG. 3.

A further contemplated embodiment of the apparatus according to the present invention is shown in FIG. 6 and has only one ruler-type securing slide 3' but two parallel rows of apertures 2 in the holding plate 1', between which the securing slide 3' is guided displaceably by a dovetail guide 23. The apertures 2 of both rows are likewise oriented in opposite directions, but this arrangement is reversed from that shown in section in FIG. 3 such that the holding parts 2H of the apertures 2 point towards the outer edge 14' of the holding plate 1' and the insertion parts 2E of the apertures 2 towards the center of the holding plate 1'. The junction pieces 5 can thus be pushed into the apertures 2 or their holding parts 2H of a row 2R of apertures 2 of this arrangement in a diverging manner with respect to the other row 2R. Their anchorage in the holding parts 2H is, however, identical to the arrangement according to FIG. 3. All the insertion parts of both rows of apertures are partially covered by the ruler-type securing slide 3', which results in the same type of fastening of the junction pieces 5 as in the arrangement shown in the previously described figures. The catch devices and spring prestress between the securing slide 3' and the holding plate 1' and their common fastening on a component are not shown, but they are effected in an equivalent manner to that described above.

It is understood that any desired, positive-fit, straight sliding guides for the different shapes of securing slides 3 can be used. Of course, two dovetail guides can also be provided for the U-shaped securing slide of FIGS. 2 to 5 similar to FIG. 6, one for each limb 3S, and a T-shaped guide can be provided for the ruler-type securing slide of FIG. 6 similar to FIG. 3.

The apparatus according to the present invention is preferably used in the air conditioning systems of motor vehicles, where the different air flaps are driven by pneumatic actuating elements. The lines leading away from the junction pieces 5 are each connected to an actuating element. Via the component 4 which can, as mentioned, be a magnetic valve module, these actuating elements are connected, depending on the valve actuation, to a common positive or negative pressure generator. The required plug connections can thus be produced in a particularly simple and reliable manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus for supporting a simultaneous establishment of a plurality of parallel fluid plug connections, comprising a holding plate having apertures arranged in at least one straight row to receive axially inserted junction pieces of fluid lines which are provided with abutments, a securing slide, positive-fit guiding means for displaceably guiding said securing slide along the at least one straight row of apertures in the holding plate, said securing slide having at least one contour which, by displacing the securing slide can be brought into a position fastening the junction pieces in the apertures, wherein positive-fit axial fixing of the junction pieces are positive-fit axially fixed in the holding plate by an edge of the holding plate apertures of other than circular configuration, which edge extends at least over a limited perimeter section of each aperture and is configured to engage with the abutments of the junction pieces, each said edge being provided on one side and at the end of the greatest inside diameter of the apertures, and lateral fastening of the junction pieces transversely to their insertion direction within the apertures in the position in which their abutments are in engagement with the edge by the at least one contour of the securing slide, which contour is straight and extends in relation to the edge on the side of the junction pieces facing away from said edge.

2. The apparatus according to claim 1, wherein the apertures of the holding plate having an insertion part, provided for axial insertion of the junction pieces and the abutments, are of greater inside diameter and have a holding part which is provided with the edge of smaller inside diameter, is approximately round and partially overlaps the insertion part, the junction pieces are axially fastened in the holding part of the respective aperture after their axial insertion in the insertion part for which purpose the junction pieces are pushed transversely to their insertion direction and in a direction of the greatest inside diameter of the respective aperture and the abutments are brought into engagement with the edge of the holding part, the greatest inside diameter of all the apertures is angularly oriented relative to the slide direction and the at least one straight contour of the securing slide, and the insertion parts of the apertures are at least partially covered by the pushed-in securing slide, by which the junction pieces are fastened in the respective holding part by the at least one straight contour of the securing slide.

3. The apparatus according to claim 2, wherein narrowings are provided in the apertures in the transition region from their insertion part to their holding part, which narrowings are narrower than an inside diameter of the holding parts of the apertures and allow the junction pieces to snap into the holding parts of the apertures.

4. The apparatus according to claim 3, wherein the greatest inside diameters of all the apertures of one row are oriented identically relative to the slide direction of the securing slide.

5. The apparatus according to claim 1, wherein the greatest inside diameters of all the apertures of one row are oriented identically relative to the slide direction of the securing slide.

6. The apparatus according to claim 5, wherein the apertures of the holding plate having an insertion part, provided for axial insertion of the junction pieces and the abutments, are of greater inside diameter and have a holding part which is provided with the edge of smaller inside diameter, is approximately round and partially overlaps the insertion part, the junction pieces are axially fastened in the holding part of the respective aperture after their axial insertion in the insertion part for which purpose the junction pieces are pushed transversely to their insertion direction and in a direction of the greatest inside diameter of the respective aperture and the abutments are brought into engagement with the edge of the holding part, the greatest inside diameter of all the apertures is angularly oriented relative to the slide direction and the at least one straight contour of the securing slide, and the insertion parts of the apertures are at least partially covered by the pushed-in securing slide, by which the junction pieces are fastened in the respective holding part by the at least one straight contour of the securing slide.

7. The apparatus according to claim 5, wherein the greatest inside diameters of all the apertures of one row are oriented in the same direction at right angles to the slide direction of the securing slide.

8. The apparatus according to claim 1, wherein there are provided at least two straight contours of the securing slide, which contours run parallel to the slide direction of the securing slide, and said positive-fit guiding means comprises at least one T-shaped guide in the holding plate for guiding the securing slide, the transverse portion of which is dimensioned for the sliding guiding of said parallel straight contours of the securing slide.

9. The apparatus according to claim 8, wherein the apertures of the holding plate having an insertion part, provided for axial insertion of the junction pieces and the abutments, are of greater inside diameter and have a holding part which is provided with the edge of smaller inside diameter, is approximately round and partially overlaps the insertion part, the junction pieces are axially fastened in the holding part of the respective aperture after their axial insertion in the insertion part for which purpose the junction pieces are pushed transversely to their insertion direction and in a direction of the greatest inside diameter of the respective aperture and the abutments are brought into engagement with the edge of the holding part, the greatest inside diameter of all the apertures is angularly oriented relative to the slide direction and the at least one straight contour of the securing slide, and the insertion parts of the apertures are at least partially covered by the pushed-in securing slide, by which the junction pieces are fastened in the respective holding part by the at least one straight contour of the securing slide.

10. The apparatus according to claim 9, wherein the greatest inside diameters of all the apertures of one row are oriented identically relative to the slide direction of the securing slide.

11. The apparatus according to claim 10, wherein narrowings are provided in the apertures in the transition region from their insertion part of their holding part, which narrowings are narrower than an inside diameter of the holding parts of the apertures and allow the junction pieces to snap into the holding parts of the apertures.

12. The apparatus according to claim 8, wherein a free end of each straight contour of the securing slide has a sloping surface.

13. The apparatus according to claim 8, wherein a catch device is arranged to prevent the securing slide from being pushed out of the guides of the holding plate.

14. The apparatus according to claim 13, wherein a spring acts between the securing slide and the holding plate and prestresses the pushed-in securing slide against the catch device.

15. The apparatus according to claim 14, wherein a pin of the securing slide is arranged with respect to a borehole of the holding plate for supporting one end of the spring.

16. The apparatus according to claim 14, wherein at least one centering means is molded onto the component and, in interaction with at least one contour of the securing slide, for providing an assured short-stroke relative movement, directed against the force of the spring, of the securing slide away from the catch device when the holding plate is placed on the component, such that relative movement the recesses of the securing slide are always automatically centered on their corresponding shoulders of the component.

17. The apparatus according to claim 16, wherein the recesses having the sloping end sides, and the corresponding sloping end sides of the shoulders are arranged such that when the holding plate is placed on the component in the position specified by the coding elements and when a force directed onto the component is exerted on the holding plate, a relative movement of the securing slide occurs in relation to the holding plate and at least abutting mechanical contact of the respective corresponding stepped contours of one of the connection elements and the connecting means positively occurs.

18. The apparatus according to claim 1, wherein there are provided at least two straight contours of the securing slide, which contours run parallel to the slide direction of the securing slide, and said positive-fit guiding means comprises at least one dovetail-shaped guide in the holding plate for guiding the securing slide, which guide is dimensioned for the sliding guiding of said parallel straight contours of the securing slide.

19. The apparatus according to claim 18, wherein the apertures of the holding plate having an insertion part, provided for axial insertion of the junction pieces and the abutments, are of greater inside diameter and have a holding part which is provided with the edge of smaller inside diameter, is approximately round and partially overlaps the insertion part, the junction pieces are axially fastened in the holding part of the respective aperture after their axial insertion in the insertion part for which purpose the junction pieces are pushed transversely to their insertion direction and in a direction of the greatest inside diameter of the respective aperture and the abutments are brought into engagement with the edge of the holding part, the greatest inside diameter of all the apertures is angularly oriented relative to the slide direction and the at least one straight contour of the securing slide, and the insertion parts of the apertures are at least partially covered by the pushed-in securing slide, by which the junction pieces are fastened in the respective holding part by the at least one straight contour of the securing slide.

20. The apparatus according to claim 19, wherein the greatest inside diameters of all the apertures of one row are oriented identically relative to the slide direction of the securing slide.

21. The apparatus according to claim 20, wherein narrowings are provided in the apertures in the transition region from their insertion part to their holding part, which narrowings are narrower than an inside diameter of the holding parts of the apertures and allow the junction pieces to snap into the holding parts of the apertures.

22. The apparatus according to claim 1, wherein the holding plate, contains two parallel rows of apertures with a reversed arrangement of the apertures lying in the different rows, and two opposite straight contours of the securing slide, which contours face one of the two rows of apertures in each case when the securing slide has been pushed in.

23. The apparatus according to claim 22, wherein the reversed arrangement of the apertures of the holding plate lays in the different rows such that the junction pieces in the respective rows can be pushed into the holding part of the apertures in a diverging manner relative to the other row, and generally a ruler-type configuration of the securing slide having two straight longitudinal edges which extend longitudinally to the displacement direction of the securing slide, are guided in the holding plate and form the contours fastening the junction pieces.

24. The apparatus according to claim 22, wherein the reversed arrangement of the apertures lay in the different rows such that the junction pieces in the respective rows can be pushed into the holding part of the apertures in a converging manner relative to the other row in each case, and an essentially U-shaped securing slide having two limbs which extend longitudinally to the displacement direction of the securing slide and are guided in the holding plate, whereby the straight insides or outsides of each of these limbs is guided in each case in a T-shaped guide of the holding plate comprising said positive-fit guiding means, and the insides of the limbs form the contours fastening the junction pieces.

25. The apparatus according to claim 1, wherein connection elements arranged solely on the securing slide effect a joint attachment of the holding plate and the securing slide with the junction pieces which have been plugged in and secured by the securing slide, to a component which, with the joint attachment with the junction pieces, is to be contacted fluidically and which, in turn, has connectors corresponding to the connection elements of the holding plate.

26. The apparatus according to claim 25, wherein coding elements define a specific assembly position of the holding plate on the component, in which position the apertures of the holding plate are exactly aligned on fluid connectors of the component which are to be connected fluidically to the junction pieces and open out on an upper side of the component whereby the coding elements, are molded integrally onto one of the holding plate and the component, for a positive fit configuration which can be plugged, such that the center-axes of the holding parts of the apertures are aligned on the center-axes of the connectors of the component and, when the holding plate is placed on the component, the holding plate is guided perpendicular to the upper side of said component.

27. The apparatus according to claim 25, wherein there are provided at least one stepped contour on at least one connection element of the securing slide and one stepped contour complementary in shape to the stepped contour on the connection element on each connector of the component, whereby a locking of the securing slide, which is guided in the holding plate with the plugged-in junction pieces, on the component can be effected to prevent the plugged-in junction pieces being pulled off from the component.

28. The apparatus according to claim 25, wherein coding elements define assembly position of the holding plate on the component, in which position the apertures of the holding plate are exactly aligned on fluid connectors of the component which are to be connected fluidically to the junction pieces and open out on an upper side of the component whereby the coding elements, are molded integrally onto one of the holding plate and the component, for a positive fit configuration which can be plugged, such that the center-axes of the holding parts of the apertures are aligned on the center-axes of the connectors of the component and, when the holding plate is placed on the component, the holding plate is guided perpendicular to the upper side of said component.

29. The apparatus according to claim 26, wherein guide elements are arranged on the securing slide, and guide means, corresponding to the guide elements on the securing slide, are arranged on the component, to effect a simultaneous relative movement between the securing slide and the holding plate when the holding plate is placed on the component, guided by the coding elements, in the direction of a locking connection of the securing slide to the component via one of the connection elements and connection means.

30. The apparatus according to claim 29, wherein there are provided at least one stepped contour on at least one connection element of the securing slide and one stepped contour complementary in shape to the stepped contour on the connection element on each connector of the component, whereby a locking of the securing slide, which is guided in the holding plate with the plugged-in junction pieces, on the component can be effected to prevent the plugged-in junction pieces being pulled off from the component.

31. The apparatus according to claim 29, wherein the guide elements of the securing slide are configured as at least two trapezoidal recesses distributed over the longitudinal extension of said securing slide and each having at least one sloping end side, and the guide means of the component being configured as at least two shoulders on the component, which shoulders correspond in shape to one of the recesses in each case of the securing slide and likewise each have a sloping side.

32. The apparatus according to claim 17, wherein the recesses having the sloping end sides, and the corresponding sloping end sides of the shoulders are arranged such that when the holding plate is placed on the component in the position specified by the coding elements and when a force directed onto the component is exerted on the holding plate, a relative movement of the securing slide occurs in relation to the holding plate and at least abutting mechanical contact of the respective corresponding stepped contours of one of the connection elements and the connecting means positively occurs.

33. The apparatus according to claim 32, wherein the guide elements of the securing slide are configured as at least two trapezoidal recesses distributed over the longitudinal extension of said securing slide and each having at least one sloping end side, and the guide means of the component being configured as at least two shoulders on the component, which shoulders correspond in shape to one of the recesses in each case of the securing slide and likewise each have a sloping side.

34. The apparatus according to claim 32, wherein a handle is provided on the securing slide for introducing pushing forces thereto such that the respective corresponding stepped contours of one of the connection elements and the connection means can be brought out of engagement, and the securing slide, together with the holding plate, can be pushed away from the component via the sloping sides of the recesses and the corresponding sloping sides of the shoulders with simultaneous fluidic separation of the junction pieces from the fluid connectors of the component.

* * * * *